United States Patent
Folkesson et al.

(10) Patent No.: US 12,038,073 B2
(45) Date of Patent: Jul. 16, 2024

(54) TRANSMISSION FOR A VEHICLE

(71) Applicant: Volvo Truck Corporation, Gothenburg (SE)

(72) Inventors: Johan Folkesson, Skene (SE); Richard Torsein, Lerum (SE); Anders Hedman, Marstrand (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/567,175

(22) PCT Filed: Jun. 8, 2021

(86) PCT No.: PCT/EP2021/065257
§ 371 (c)(1),
(2) Date: Dec. 5, 2023

(87) PCT Pub. No.: WO2022/258143
PCT Pub. Date: Dec. 15, 2022

(65) Prior Publication Data
US 2024/0133448 A1    Apr. 25, 2024

(51) Int. Cl.
*F16H 3/48*    (2006.01)
*B60K 1/02*    (2006.01)
*B60K 17/08*   (2006.01)

(52) U.S. Cl.
CPC ............... *F16H 3/48* (2013.01); *B60K 1/02* (2013.01); *B60K 17/08* (2013.01);
(Continued)

(58) Field of Classification Search
CPC ............... F16H 3/48; F16H 2200/0021; F16H 2200/0034; F16H 2200/20; B60K 1/02; B60K 17/08
See application file for complete search history.

(56) References Cited

U.S. PATENT DOCUMENTS

2021/0347244 A1*  11/2021  Kaltenbach ............. B60K 6/48

FOREIGN PATENT DOCUMENTS

| CA | 3058222 A1 * | 10/2018 | ............. B60K 1/02 |
| CN | 207916551 U * |  9/2018 | ............. B60K 6/24 |

(Continued)

OTHER PUBLICATIONS

International Search Report and Written Opinon of the International Searching Authority, International Application No. PCT/EP2021/065257, mailed Feb. 4, 2022, 14 pages.

*Primary Examiner* — Justin Holmes
(74) *Attorney, Agent, or Firm* — Sage Patent Group

(57) ABSTRACT

A transmission for a vehicle includes
a first input shaft,
a second input shaft,
an output shaft,
a planetary gear set arranged on the output shaft, including a sun gear, planet carrier and ring gear,
an output shaft first gearwheel,
an output shaft second gearwheel,
wherein the first input shaft gearwheel is drivingly connected with the output shaft first gearwheel and the second input shaft gearwheel is drivingly connected with the output shaft second gearwheel, wherein the output shaft second gearwheel is permanently connected to the sun gear and rotatable with respect to the output shaft, the output shaft first gearwheel is rotatable with respect to the output shaft, and the output shaft first gearwheel is further engageable with the output shaft in a first gear mode and engageable with the output shaft second gearwheel in a second gear mode.

15 Claims, 6 Drawing Sheets

(52) U.S. Cl.
  CPC .............. *F16H 2200/0021* (2013.01); *F16H 2200/0034* (2013.01); *F16H 2200/2005* (2013.01)

(56) References Cited

FOREIGN PATENT DOCUMENTS

| | | | | |
|---|---|---|---|---|
| CN | 113043827 B | * | 9/2022 | ............. B60K 6/365 |
| EP | 2450215 A1 | | 5/2012 | |
| WO | 2021073748 A1 | | 4/2021 | |
| WO | 2021089128 A1 | | 5/2021 | |

* cited by examiner

TRANSMISSION FOR A VEHICLE

CROSS REFERENCE TO RELATED APPLICATIONS

This application is a 35 U.S.C. § 371 national stage application of PCT International Application No. PCT/EP2021/065257 filed on Jun. 8, 2021, the disclosure and content of which is incorporated by reference herein in its entirety.

TECHNICAL FIELD

The present disclosure relates to a transmission for a vehicle, in particular for a heavy-duty vehicle. The present disclosure also relates to a drive train comprising the transmission and to a vehicle comprising the transmission and/or the drive train.

The present disclosure can be applied in heavy-duty vehicles, such as trucks, buses, and construction equipment. Although the present disclosure will be described with respect to a heavy-duty truck, the disclosed subject matter is not restricted to this particular vehicle, but may also be used in other vehicles, in particular in other heavy-duty vehicles.

BACKGROUND

There are different types of transmissions for heavy-duty vehicles, such as trucks. For example, there are different types of automatic transmissions and also different types of manual transmissions.

An automatic transmission may be configured as an automatic mechanically engaged transmission (AMT), whose basic construction is similar to that of a manual transmission, but the gear shifts are performed by use of one or more actuators which are controlled by a transmission control unit.

The transmission is arranged to transfer power from a primary power source to drivable ground engaging means, typically wheels. The primary power source is likely an internal combustion engine, such as a diesel engine.

However, due to for example the trend of electrification, new demands for the transmission have arisen. For example, the new demands relate to the desire of using more than one power source, such as using two electric motors, or one internal combustion engine and one or more electric motors.

Due to the new demands, existing transmission designs for heavy-duty vehicles may not always be preferred, and there is therefore a need to develop a new transmission which provides at least one of high torque capacity, high efficiency and a compact configuration for a drive train comprising at least two power sources.

SUMMARY

In view of the above, an object of the present disclosure is to provide an improved transmission which to at least some extent alleviates at least one of the drawbacks of the prior art. A further object is to provide a transmission which provides at least one of high torque capacity, high efficiency and a compact configuration for a drive train comprising at least two power sources. Yet further objects of the present disclosure are to provide an improved drive train and an improved vehicle.

According to a first aspect, the object is achieved by a transmission according to claim 1.

Thus, a transmission for a vehicle is provided. The transmission comprises:

a first input shaft connectable to a first power source, wherein a first input shaft gearwheel is arranged on the first input shaft, a second input shaft connectable to a second power source, wherein a second input shaft gearwheel is arranged on the second input shaft, an output shaft connectable to ground engaging means of the vehicle, a planetary gear set arranged on the output shaft, comprising a sun gear, a planet carrier and a ring gear, an output shaft first gearwheel arranged on the output shaft, an output shaft second gearwheel arranged on the output shaft, wherein the first input shaft gearwheel is drivingly connected with the output shaft first gearwheel and the second input shaft gearwheel is drivingly connected with the output shaft second gearwheel.

In addition, the output shaft second gearwheel is permanently connected to the sun gear and rotatable with respect to the output shaft, the output shaft first gearwheel is rotatable with respect to the output shaft, and the output shaft first gearwheel is further engageable with the output shaft in a first gear mode and engageable with the output shaft second gearwheel in a second different gear mode.

By the provision of the transmission as disclosed herein, a transmission with at least one of high torque capacity, high efficiency and a compact configuration is achieved. For example, by the transmission configuration it will be possible to shift the planetary gear set between a low range and a high range without any torque interruption. Accordingly, the planetary gear set configuration as disclosed herein may according to one example embodiment be denoted a range gear. The high range may be defined as a direct 1:1 gear where the input speed is equal to the output speed of the range gear. The low range may be defined as gear mode of the range gear where the gear ratio is relatively high, e.g. the input speed is considerably higher than the output speed, such as 4:1. Due to the configuration of the output shaft first gearwheel, i.e. it can be engaged with either the output shaft in the first gear mode or engaged with the output shaft second gearwheel in the second different gear mode, the range gear can be shifted from high range to low range and vice versa without any torque interruption. In addition, by the transmission configuration, both the first and second power sources can be engaged with the sun gear simultaneously in the low range mode.

Further, by the transmission as disclosed herein, beneficial gear modes can be realized by a small amount of gear wheel and/or planetary gears, thereby achieving a compact configuration for a transmission which is connectable to two power sources.

By the configuration of the output shaft first gearwheel, the output shaft first gearwheel may be provided in three different gear states, one state where the output shaft first gearwheel is rotatable with respect to the output shaft, a second state where the output shaft first gearwheel is engaged with the output shaft and a third state where the output shaft first gearwheel is engaged with the output shaft second gearwheel.

Optionally, the first input shaft gearwheel may be permanently connected to the first input shaft and/or the second input shaft gearwheel may be permanently connected to the second input shaft. Thereby, a facilitated configuration may be achieved, reducing the number of components, such as bearings, implying cost-effectiveness, longer service life and a reduced maintenance need.

Optionally, the output shaft first gearwheel may be engageable with the output shaft at a first axial side with respect to the output shaft first gearwheel and may further be engageable with the output shaft second gearwheel at a second opposite axial side with respect to the output shaft first gearwheel, wherein the planetary gear set can be provided on the second opposite axial side. The axial sides relate to an axial extension of the output shaft. This configuration may for example provide increased space for gear selector members, implying reduced complexity and a more cost-effective configuration.

Optionally, the output shaft first gearwheel may be engageable with the output shaft and the output shaft second gearwheel in an area between the output shaft first and second gearwheels. This configuration implies a more compact transmission. The area may be defined as an area extending in the axial extension of the output shaft.

Optionally, the planet carrier may be permanently connected to the output shaft.

Optionally, the ring gear may be selectively engageable with a transmission housing and the sun gear. Accordingly, the ring gear may be engaged with the transmission housing in one gear state and engaged with the sun gear in another gear state.

Optionally, the ring gear may be selectively engageable with a transmission housing and the planet carrier. Accordingly, the ring gear may be engaged with the transmission housing in one gear state and engaged with the planet carrier in another gear state.

Optionally, the transmission may be configured such that a gear ratio between the first input shaft gearwheel and the output shaft first gearwheel is larger than a gear ratio between the second input shaft gearwheel and the output shaft second gearwheel. Thereby, a more beneficial gear sequence of the transmission may be achieved. For example, a first "gear", or "gear one", may be provided by a torque path from the first input shaft via the first input shaft gearwheel, the output shaft first gearwheel and the sun gear (low range) to the output shaft. A second "gear", or "gear two", may be provided by a torque path from the second input shaft via the second input shaft gearwheel, the output shaft second gearwheel and the sun gear (low range) to the output shaft. A third "gear", or "gear three", may be provided by a torque path from the first input shaft via the first input shaft gearwheel, the output shaft first gearwheel to the output shaft (range bypassed). A fourth "gear", or "gear four", may be provided by a torque path from the second input shaft via the second input shaft gearwheel, the output shaft second gearwheel and the sun gear (high range) to the output shaft. Hence, it is of advantage if the speed ratio from the first input shaft gearwheel to the output shaft first gearwheel is larger than from the second input shaft gearwheel to the output shaft second gearwheel.

Optionally, the transmission may further comprise a first gear selector, wherein the output shaft first gearwheel is selectively engageable with the output shaft and the output shaft second gearwheel by use of the first gear selector, wherein the first gear selector comprises two separate gear selector members or one single gear selector member. Two separate gear selector members implies increased flexibility, allowing the gear selector members to be controlled individually. One single gear selector member implies a more compact and less complex configuration, e.g. requiring fewer parts for moving the gear selector member.

Optionally, when the first gear selector comprises two separate gear selector members, the transmission may be configured such that the two separate gear selector members move synchronously during gear shifting by use of the first gear selector. Thereby, only one actuator may be used for moving the two gear selector members, implying facilitated gear shifting control and fewer components.

The gear selector members as disclosed herein may for example be sleeve-formed members. Each sleeve-formed member may for example be connected to an actuator via e.g. a shift-fork.

Optionally, the transmission may further comprise a first input shaft second gearwheel arranged on the first input shaft, wherein the first input shaft second gearwheel is rotatable with respect to the first input shaft and engageable with the first input shaft, and wherein the first input shaft second gearwheel is meshing with the output shaft second gearwheel. Thereby, a further possible torque path is achieved, enabling e.g. a higher top gear for the first input shaft.

Optionally, the transmission may further comprise a transmission control unit for automatically changing gears of the transmission. Accordingly, the transmission as disclosed herein may be an automatic mechanically engaged transmission (AMT). Gear shifts may be automatically performed based on shifting control signals to the transmission control unit which are initiated by a driver and/or gear shifts may be automatically performed based on sensor input to the transmission control unit, such as sensor signals indicative of torque levels, speed of the vehicle, rotation speed of the input shafts, rotation speed of the output shaft etc.

According to a second aspect, the object is achieved by a drive train according to claim 13. Thus, a drive train is provided which comprises the transmission according to any one of the embodiments of the first aspect, and further comprising a first power source associated with the first input shaft and a second power source associated with the second input shaft.

Advantages and effects of the second aspect of the present disclosure are analogous to the advantages and effects of the first aspect of the present disclosure. It shall also be noted that all embodiments of the first aspect of the present disclosure are combinable with all embodiments of the second aspect of the present disclosure and vice versa.

The first power source may be directly coupled to the first input shaft or it may be coupled to the first input shaft via a clutch member, such as a friction clutch. The second power source may be directly coupled to the second input shaft or it may be coupled to the second input shaft via a clutch member, such as a friction clutch.

Optionally, the first and second power sources may be electric motors. Any one of the electric motors may also be configured as a generator for generating electric power, such as for charging a battery and/or driving an electrically powered unit.

According to a third aspect, the object is achieved by a vehicle according to claim 15. Thus, a vehicle is provided which comprises the transmission according to any one of the embodiments of the first aspect or the drive train according to any one of the embodiments of the second aspect.

Advantages and effects of the third aspect of the present disclosure are analogous to the advantages and effects of the first and second aspects of the present disclosure. It shall also be noted that all embodiments of the third aspect of the present disclosure are combinable with all embodiments of the first and second aspects of the present disclosure and vice versa.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

Figure 1:
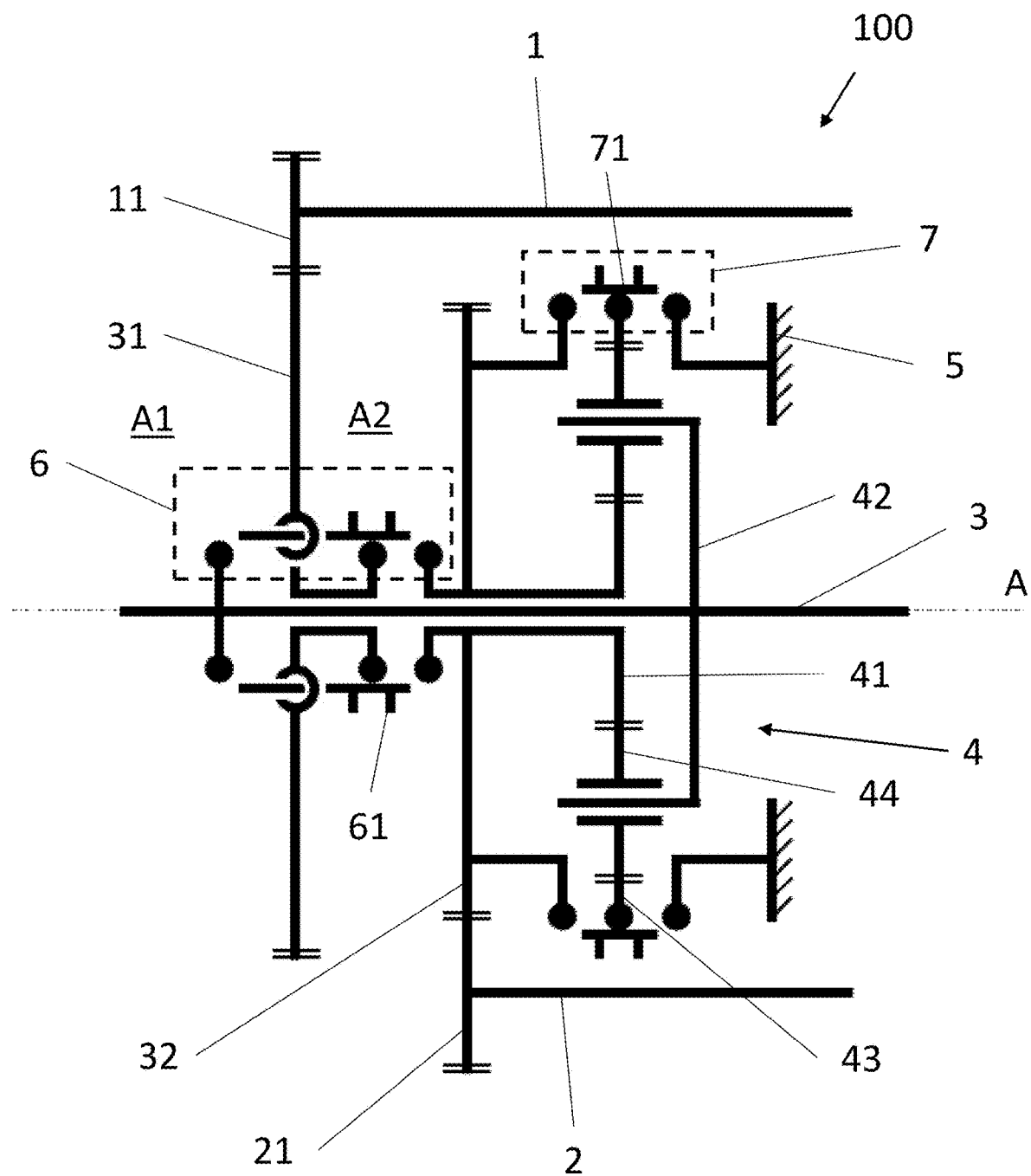
FIGS. 1-5 show schematic illustrations of embodiments of the present disclosure.

The drawings are schematic and not necessarily drawn to scale. It shall be understood that the embodiments shown and described are exemplifying and that the present disclosure is not limited to these embodiments. It shall also be noted that some details in the drawings may be exaggerated in order to better describe and illustrate the present disclosure. Like reference characters throughout the drawings refer to the same, or similar, type of element unless expressed otherwise.

DETAILED DESCRIPTION

FIGS. 1-5 depicts a transmission 100 according to example embodiments of the present disclosure.

Figure 7:
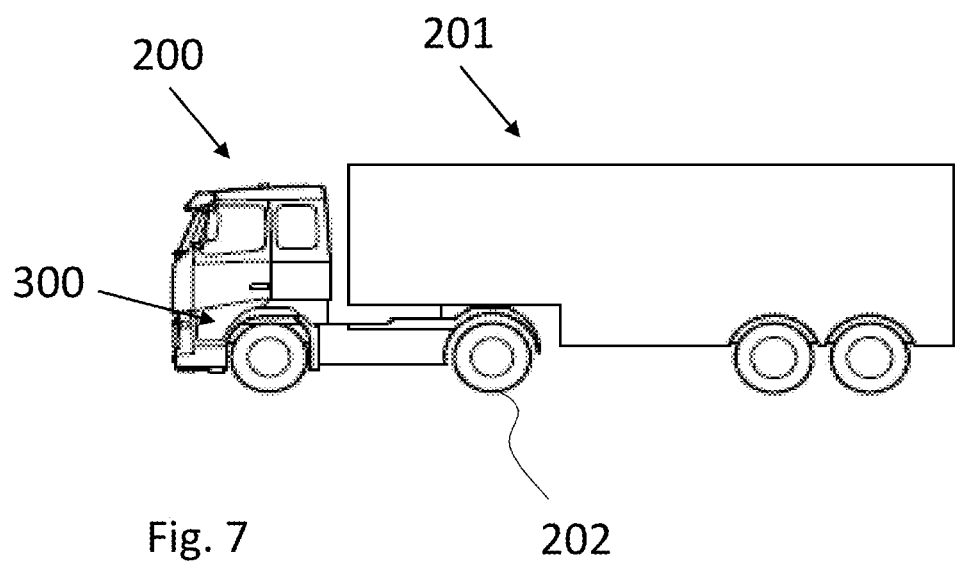
FIG. 7 is a side view of a vehicle according to an embodiment of the present disclosure.

With respect to e.g. FIG. 1, a transmission 100 for a vehicle is shown. The vehicle may for example be a truck 200 as shown in FIG. 7. Accordingly, the vehicle may be a towing truck 200, or tractor, for pulling one or more trailers 201. It shall however be understood that the vehicle may be any other type of vehicle, such as any type of heavy-duty vehicle, including but not limited to a bus, a working machine etc.

The transmission 100 comprises:
- a first input shaft 1 connectable to a first power source 310 (see FIG. 6), wherein a first input shaft gearwheel 11 is arranged on the first input shaft 1,
- a second input shaft 2 connectable to a second power source 320 (see FIG. 6), wherein a second input shaft gearwheel 21 is arranged on the second input shaft 2,
- an output shaft 3 connectable to ground engaging means 202 (e.g. rear wheels) of the vehicle 200,
- a planetary gear set 4 arranged on the output shaft 2, comprising a sun gear 41, a planet carrier 42 and a ring gear 43,
- an output shaft first gearwheel 31 arranged on the output shaft 3,
- an output shaft second gearwheel 32 arranged on the output shaft 3,
- wherein the first input shaft gearwheel 11 is drivingly connected with the output shaft first gearwheel 31 and the second input shaft gearwheel 21 is drivingly connected with the output shaft second gearwheel 32.

In a mode of operation of a transmission, two rotating parts are drivingly connected if power can be transferred between them at a constant speed ratio in said mode of operation.

In addition, the output shaft second gearwheel 32 is permanently connected to the sun gear 41 and rotatable with respect to the output shaft 3, the output shaft first gearwheel 31 is rotatable with respect to the output shaft 3, and the output shaft first gearwheel 31 is further engageable with the output shaft 3 in a first gear mode and engageable with the output shaft second gearwheel 32 in a second different gear mode.

The first input shaft gearwheel 11 may as shown be permanently connected to the first input shaft 1 and the second input shaft gearwheel 21 may be permanently connected to the second input shaft 2.

The planet carrier 42 carries a plurality of planet gear wheels 44 which mesh with and are provided in-between the sun gear 41 and the ring gear 43.

With respect to the embodiments shown in FIGS. 1-4, the output shaft first gearwheel 31 may be engageable with the output shaft 3 at a first axial side A1 with respect to the output shaft first gearwheel 31 and may further be engageable with the output shaft second gearwheel 32 at a second opposite axial side A2 with respect to the output shaft first gearwheel 31. In the shown embodiments, the planetary gear set 4 is provided on the second opposite axial side A2. The axial sides may be defined as sides with respect to a rotation axis A of the output shaft 3.

Figure 5:
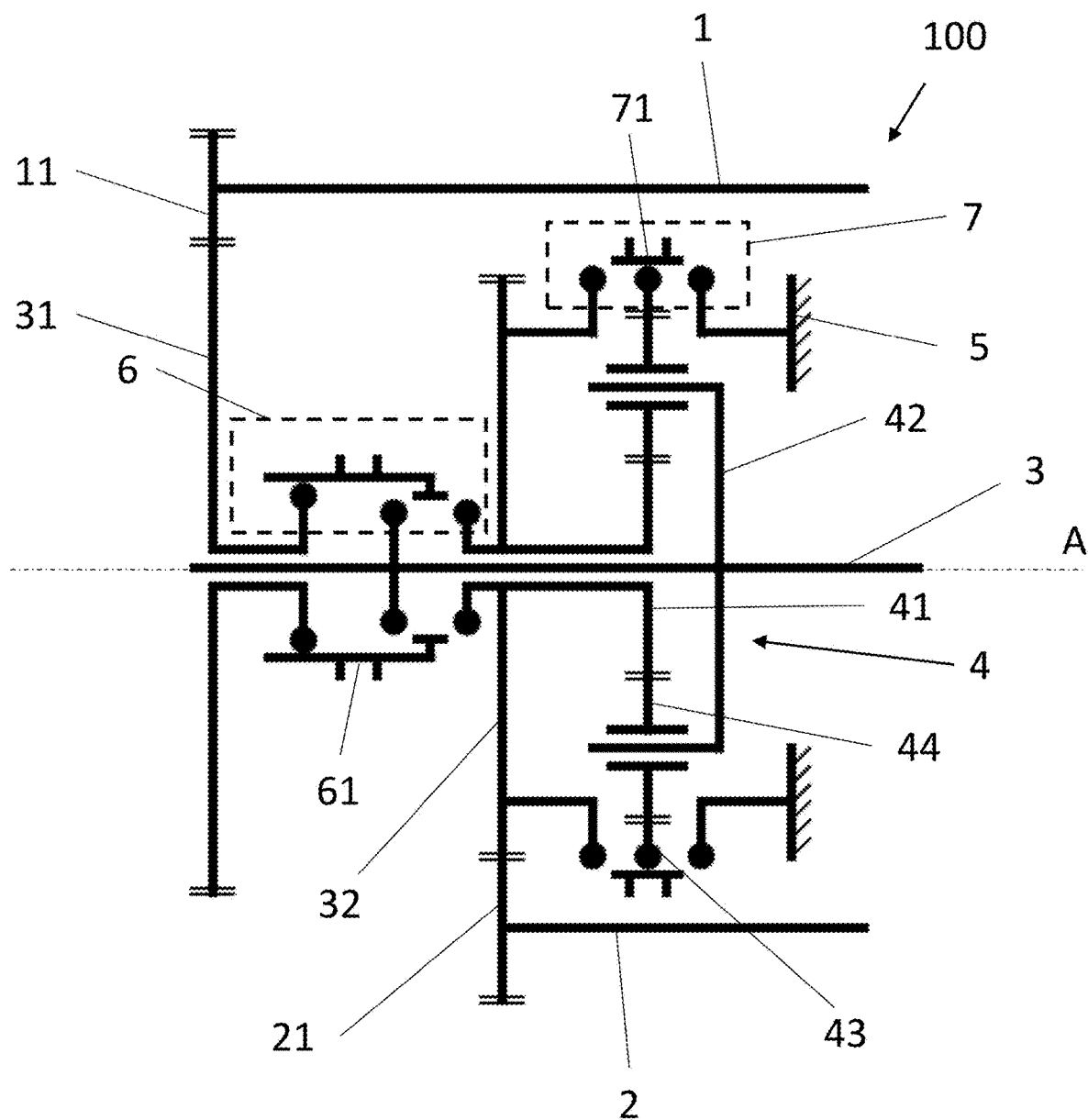

Moreover, as shown in FIG. 5, the output shaft first gearwheel 31 may be engageable with the output shaft 3 and the output shaft second gearwheel 32 in an area between the output shaft first and second gearwheels 31, 32.

In addition, as shown in FIGS. 1-5, the planet carrier 42 may be permanently connected to the output shaft 3. Still further, as shown in FIGS. 1-3 and 5, the ring gear 43 may be selectively engageable with a transmission housing 5 and the sun gear 41. Accordingly, the ring gear 43 may be engaged with the transmission housing 5 in one gear state and engaged with the sun gear 41 in another gear state. In the shown embodiments, the engagement with the sun gear 41 is accomplished via the output shaft second gearwheel 32. This gear selection may be accomplished by use of a gear selector 7 for the planetary gear set 4, such as by use of a sleeve-formed gear selector member 71.

Figure 4:
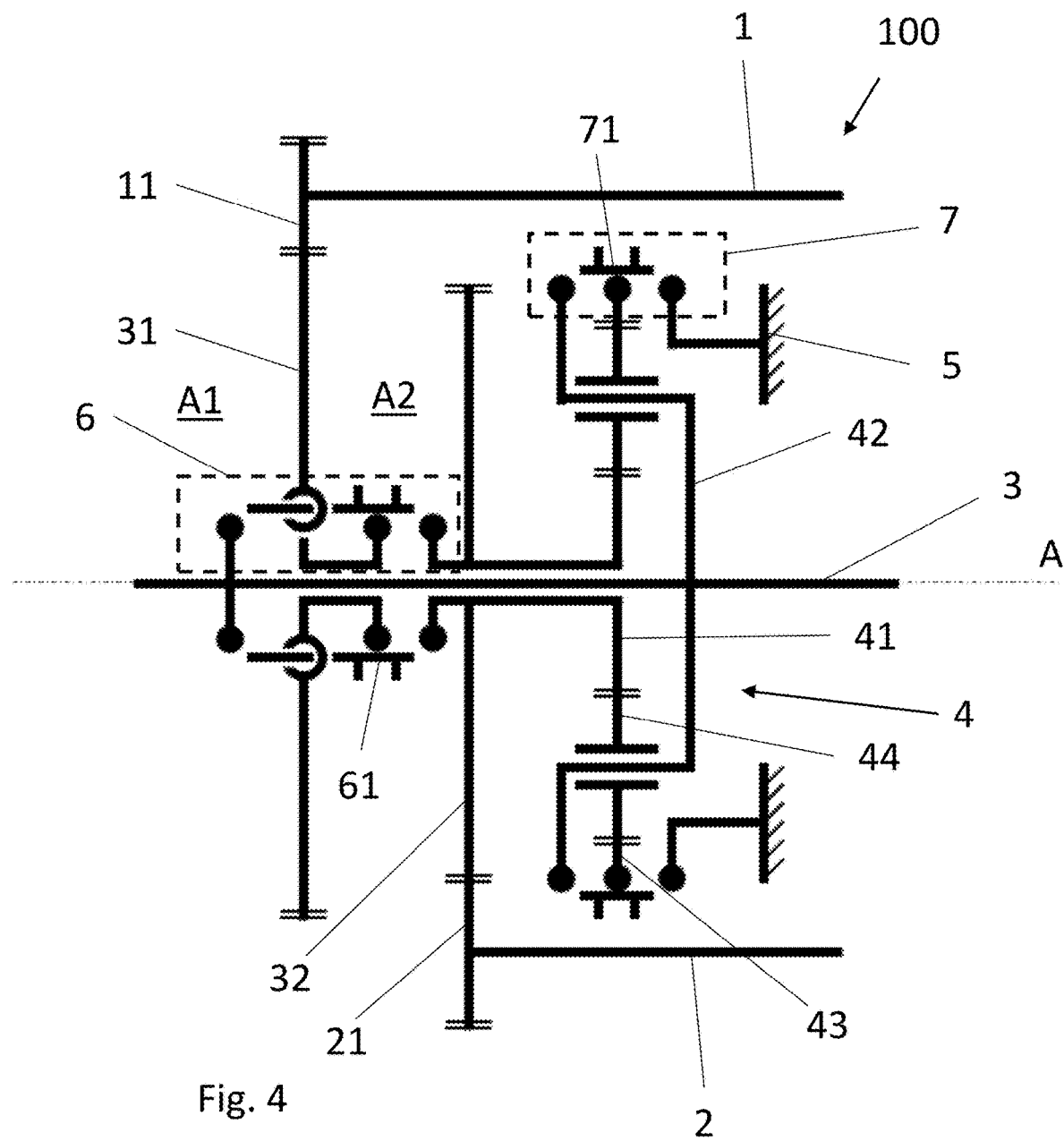

Alternatively, as shown in FIG. 4, the ring gear 43 may be selectively engageable with a transmission housing 5 and the planet carrier 42. Accordingly, the ring gear 43 may be engaged with the transmission housing 5 in one gear state and engaged with the planet carrier 42 in another gear state. This gear selection may also be accomplished by use of a gear selector 7 for the planetary gear set 4, such as by use of a sleeve-formed gear selector member 71.

As shown in the embodiments in FIGS. 1-5, the transmission 100 may be configured such that a gear ratio between the first input shaft gearwheel 11 and the output shaft first gearwheel 31 is larger than a gear ratio between the second input shaft gearwheel 21 and the output shaft second gearwheel 32. In the shown embodiments, this is accomplished by providing gear wheels with different diameters.

The transmission 100 may as shown further comprise a first gear selector 6, wherein the output shaft first gearwheel 31 is selectively engageable with the output shaft 3 and the output shaft second gearwheel 32 by use of the first gear selector 6. The first gear selector 6 may comprise two separate gear selector members 61, 62 (see FIG. 3) or one single gear selector member 61 (see FIGS. 1-2 and 4-5).

The transmission 100 may be configured such that the two separate gear selector members 61, 62 move synchronously during gear shifting by use of the first gear selector 6.

Figure 2:
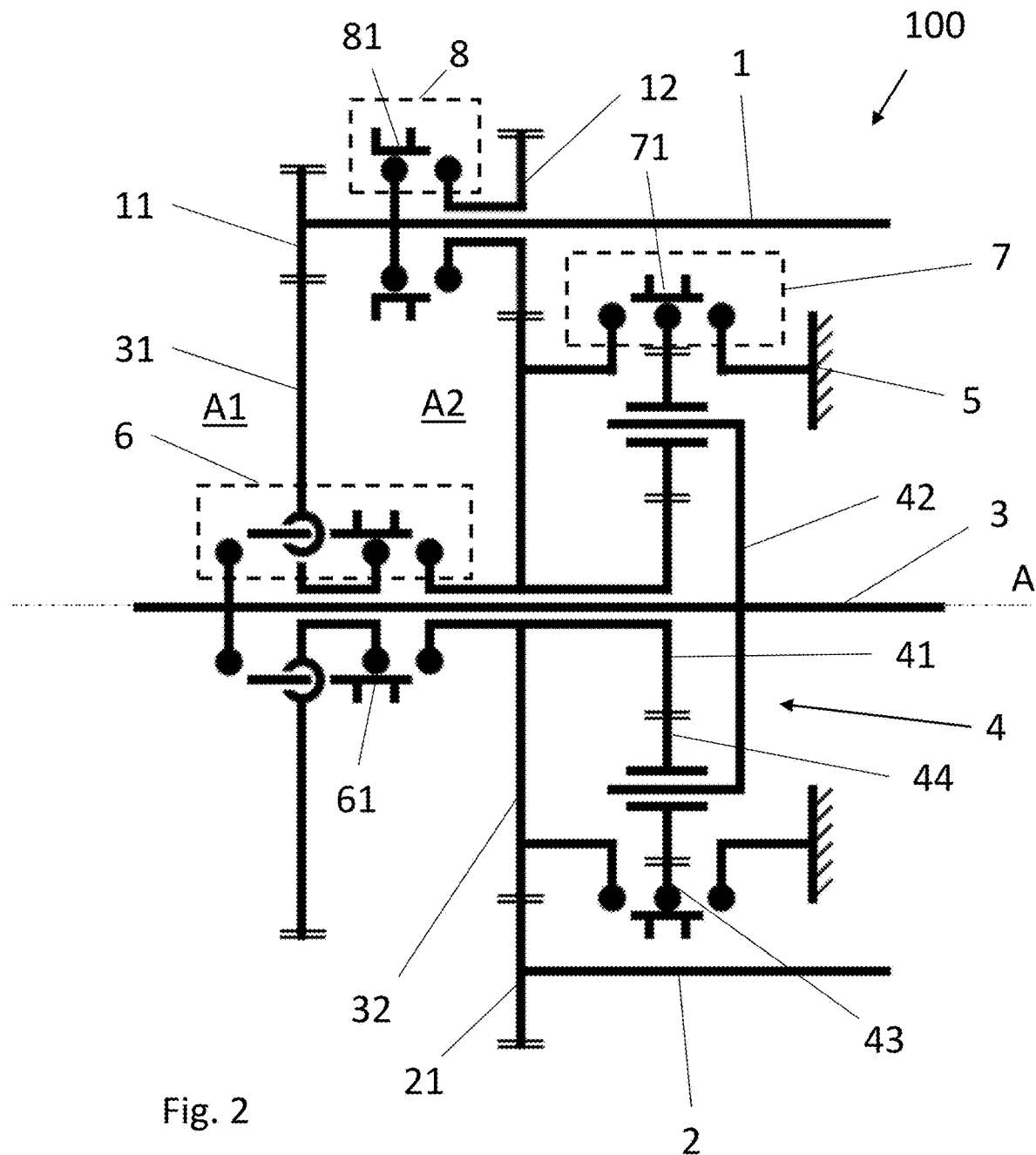
Figure 3:
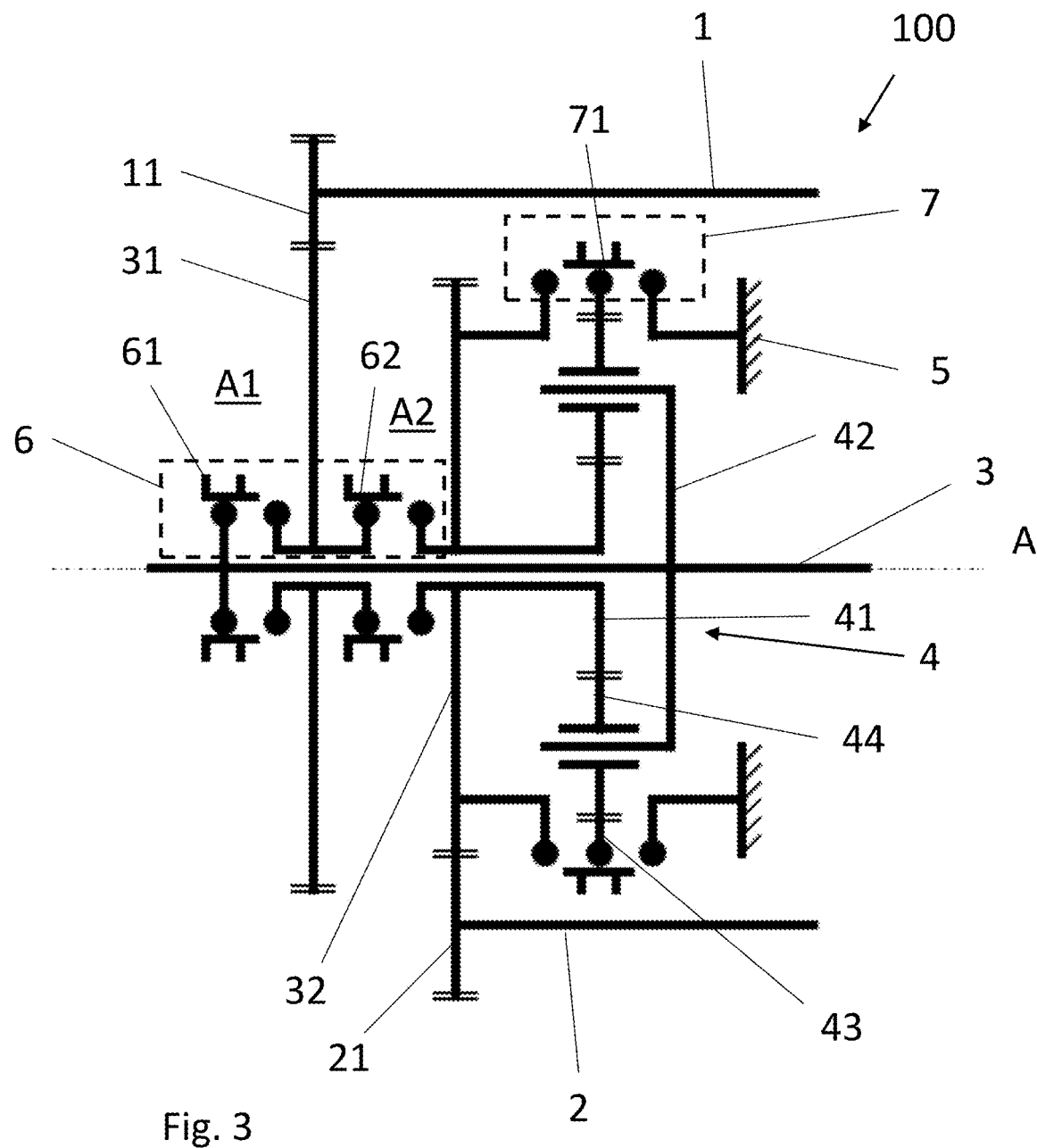

As shown in FIG. 2, the transmission 100 may further comprise a first input shaft second gearwheel 12 arranged on the first input shaft 1. The first input shaft second gearwheel 12 is rotatable with respect to the first input shaft 1 and engageable with the first input shaft 1, and the first input shaft second gearwheel 12 is meshing with the output shaft second gearwheel 32. The first input shaft second gearwheel 12 may be engageable with the first input shaft 1 via a gear selector 8 for the input shaft second gearwheel 12, such as by use of a sleeve-formed gear selector member 81.

The transmission 100 also may comprise a transmission control unit (not shown) for automatically changing gears of the transmission 100. The transmission control unit may include a microprocessor, a microcontroller, a programmable digital signal processor or another programmable device. Thus, the transmission control unit comprises electronic circuits and connections (not shown) as well as processing circuitry (not shown) such that the electronic transmission control unit can communicate with different parts of the vehicle 200 or with different control units of the vehicle 200, such as with various sensors, systems and control units, in particular with one or more electronic control units (ECUs) controlling electrical systems or subsystems in the vehicle 200, such as an engine control unit. The electronic transmission control unit may comprise modules in either hardware or software, or partially in hardware or software, and communicate using known transmission buses such a CAN-bus and/or wireless communication capabilities. The processing circuitry may be a general-purpose processor or a specific processor. The electronic transmission control unit may comprise a non-transitory memory for storing computer program code and data. Thus, the skilled person realizes that the electronic transmission control unit may be embodied by many different constructions.

By the transmission 100 as disclosed herein, the first input shaft 1 may provide a $1^{st}$ and a $3^{rd}$ gear state or "gear" of the transmission and the second input shaft may provide a $2^{nd}$ and $4^{th}$ gear state or "gear". Therefore, the following gear combinations are possible:

Neutral, $1^{st}+2^{nd}$, $2^{nd}$, $2^{nd}+3^{rd}$, $3^{rd}$, $3^{rd}+4^{th}$ and $4^{th}$. Accordingly, the $1^{st}$ and the $3^{rd}$ "gear" may be shifted by moving the gear selector 6, and the $2^{nd}$ and $4^{th}$ "gear" may be shifted by moving the gear selector 7. The neutral state is achieved by providing the gear selector 6 such that the output shaft first gearwheel 31 is not engaged with any one of the output shaft 3 or the output shaft second gearwheel 32, and by also providing the gear selector 7 such that no torque can be transferred from the output shaft second gearwheel 32 to the output shaft 3.

Figure 6:
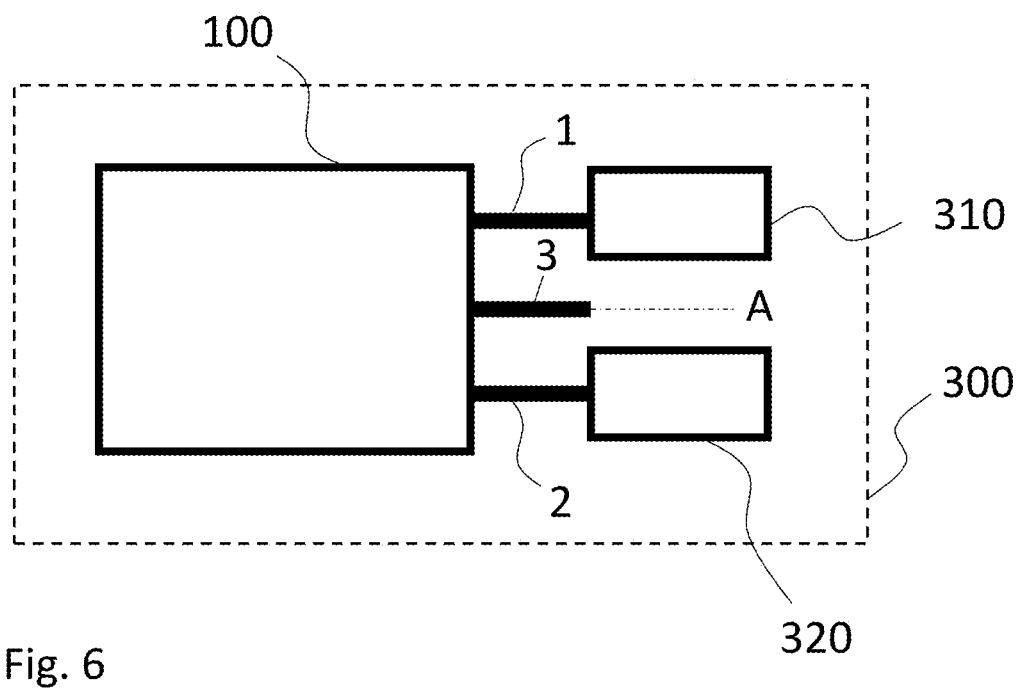
FIG. 6 is a schematic view of a drive train according to an embodiment of the present disclosure.

With respect to FIG. 6, the present disclosure also relates to a drive train 300 comprising the transmission 100 according to any one of the embodiments as disclosed herein. The drive train 300 further comprises a first power source 310 associated with the first input shaft 1 and a second power source 320 associated with the second input shaft 2. The power sources 310, 320 are here electric motors, even though also other types of power sources are possible. As shown, the first input shaft 3, the second input shaft 2 and the output shaft may be arranged parallel, or substantially parallel, with respect to each other. The drive train 300 may be arranged in the truck 200, such as below the driver's cabin. As further shown, the drive train 300 and/or the transmission 100 may be configured such that connections to the input shafts 1, 2 and the output shaft 3 are provided on the same axial side thereof, even though also other configurations are possible.

In view of the above embodiments, a transmission with high torque capacity, high efficiency and a compact configuration is provided.

It is to be understood that the present disclosure is not limited to the embodiments described above and illustrated in the drawings; rather, the skilled person will recognize that many changes and modifications may be made within the scope of the appended claims.

The invention claimed is:

1. A transmission for a vehicle, comprising:
a first input shaft connectable to a first power source, wherein a first input shaft gearwheel is arranged on the first input shaft,
a second input shaft connectable to a second power source, wherein a second input shaft gearwheel is arranged on the second input shaft,
an output shaft connectable to ground engaging means of the vehicle,
a planetary gear set arranged on the output shaft, comprising a sun gear, a planet carrier and a ring gear,
an output shaft first gearwheel arranged on the output shaft,
an output shaft second gearwheel arranged on the output shaft,
wherein the first input shaft gearwheel is drivingly connected with the output shaft first gearwheel and the second input shaft gearwheel is drivingly connected with the output shaft second gearwheel,
wherein the output shaft second gearwheel is permanently connected to the sun gear and rotatable with respect to the output shaft, the output shaft first gearwheel is rotatable with respect to the output shaft, and the output shaft first gearwheel is further engageable with the output shaft in a first gear mode and engageable with the output shaft second gearwheel in a second different gear mode.

2. The transmission according to claim 1, wherein the first input shaft gearwheel is permanently connected to the first input shaft and/or the second input shaft gearwheel is permanently connected to the second input shaft.

3. The transmission 4004 according to claim 1, wherein the output shaft first gearwheel is engageable with the output shaft at a first axial side with respect to the output shaft first gearwheel and is further engageable with the output shaft second gearwheel at a second opposite axial side with respect to the output shaft first gearwheel, wherein preferably the planetary gear set is provided on the second opposite axial side.

4. The transmission according to claim 1, wherein the output shaft first gearwheel is engageable with the output shaft and the output shaft second gearwheel in an area between the output shaft first and second gearwheels.

5. The transmission according to claim 1, wherein the planet carrier is permanently connected to the output shaft.

6. The transmission according to claim 5, wherein the ring gear is selectively engageable with a transmission housing and the sun gear 414.

7. The transmission according to claim 5, wherein the ring gear is selectively engageable with a transmission housing and the planet carrier.

8. The transmission according to claim 1, wherein the transmission is configured such that a gear ratio between the first input shaft gearwheel and the output shaft first gearwheel is larger than a gear ratio between the second input shaft gearwheel and the output shaft second gearwheel.

9. The transmission according to claim 1, further comprising a first gear selector, wherein the output shaft first gearwheel is selectively engageable with the output shaft and the output shaft second gearwheel by use of the first gear selector, wherein the first gear selector comprises two separate gear selector members or one single gear selector member.

10. The transmission according to claim 9, wherein, when the first gear selector comprises two separate gear selector members, the transmission is configured such that the two separate gear selector members move synchronously during gear shifting by use of the first gear selector.

11. The transmission according to claim 1, further comprising a first input shaft second gearwheel arranged on the first input shaft, wherein the first input shaft second gearwheel is rotatable with respect to the first input shaft and engageable with the first input shaft, and wherein the first input shaft second gearwheel is meshing with the output shaft second gearwheel.

12. The transmission according to claim 1, further comprising a transmission control unit for automatically changing gears of the transmission.

13. A drive train comprising the transmission according to claim 1, and further comprising a first power source associated with the first input shaft and a second power source associated with the second input shaft.

14. The drive train according to claim 13, wherein the first and second power sources are electric motors.

15. A vehicle comprising the transmission according to claim 1.

* * * * *